United States Patent
Nakano

(10) Patent No.: US 11,393,606 B2
(45) Date of Patent: Jul. 19, 2022

(54) RADIATION TRANSMISSIVE WINDOW AND RADITION DETECTOR

(71) Applicant: JEOL Ltd., Tokyo (JP)

(72) Inventor: Hirofumi Nakano, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 17/210,745

(22) Filed: Mar. 24, 2021

(65) Prior Publication Data
US 2021/0304915 A1    Sep. 30, 2021

(30) Foreign Application Priority Data
Mar. 30, 2020   (JP) .............................. JP2020-060715

(51) Int. Cl.
*G21K 1/00* (2006.01)
*G01T 1/16* (2006.01)

(52) U.S. Cl.
CPC . *G21K 1/00* (2013.01); *G01T 1/16* (2013.01)

(58) Field of Classification Search
CPC ................................... G21K 1/00; G01T 1/16
See application file for complete search history.

(56) References Cited

U.S. PATENT DOCUMENTS

| 2012/0213336 A1* | 8/2012 | Liddiard | H01J 35/18 378/161 |
| 2015/0016593 A1* | 1/2015 | Larson | H01J 5/18 378/161 |
| 2015/0235726 A1 | 8/2015 | Ohashi et al. | |

FOREIGN PATENT DOCUMENTS

| DE | 3709462 A1 | 10/1988 |
| EP | 2525383 A2 | 11/2012 |
| EP | 2525383 A3 | 11/2012 |
| JP | 7333399 A | 12/1995 |
| JP | 2013195407 A | 9/2013 |
| JP | 2013255536 A | 12/2013 |

OTHER PUBLICATIONS

Office Action issued in JP2020060715 dated Feb. 8, 2022.
Extended European Search Report issued in EP21160491.3 dated Jul. 20, 2021.

* cited by examiner

*Primary Examiner* — Hugh Maupin
(74) *Attorney, Agent, or Firm* — The Webb Law Firm

(57) ABSTRACT

There is provided a radiation transmissive window having high radiation transmissivity. The radiation transmissive window includes: an outer frame having an opening; a radiation transmissive film closing off the opening; and a grid member that partitions the opening into a plurality of small opening portions. The grid member has a first portion, a second portion at a smaller distance to the center of the opening than the first portion, and a third portion at a smaller distance to the center of the opening than the second portion. The first portion is greater in width than the second portion. The second portion is greater in width than the third portion.

16 Claims, 8 Drawing Sheets

RADIATION TRANSMISSIVE WINDOW AND RADITION DETECTOR

CROSS-REFERENCE TO RELATED APPLICATION

This application claims priority to Japanese Patent Application No. 2020-060715 filed Mar. 30, 2020, the disclosure of which is hereby incorporated by reference in its entirety.

BACKGROUND OF THE INVENTION

1. Field of the Invention

The present invention relates to a radiation transmissive window and a radiation detector.

2. Description of the Related Art

An X-ray detector is attached, for example, to an electron microscope or the like. Such an electron microscope having the X-ray detector attached thereto can perform elemental analysis. The X-ray detector includes, for example, X-ray detecting elements, cooling elements for cooling the X-ray detecting elements, an enclosure that houses the X-ray detecting elements and the cooling elements, and an X-ray transmissive window formed in the enclosure.

In the X-ray detector, the interior of the enclosure is in a vacuum state and so it may be required that the X-ray transmissive window have sufficient mechanical strength to withstand the pressure difference between atmospheric pressure and the internal pressure of the enclosure.

In an X-ray transmissive window set forth, for example, in JP-A-7-333399, the transmissive window is made of $Si_3N_4$, SiC, $SiO_2$, BN, Be, or other material and a lattice-like support is formed on the transmissive film to reinforce it. The lattice-like support divides the X-ray transmissive film into small regions, thus enhancing the mechanical strength.

However, this support needs to be thickened as compared to the X-ray transmissive film in order to maintain the mechanical strength of the film. Therefore, depending on the shape of the support, the X-ray transmissivity is deteriorated greatly.

SUMMARY OF THE INVENTION

One aspect of the radiation transmissive window associated with the present invention comprises: an outer frame having an opening; a radiation transmissive film closing off the opening; and a grid member that partitions the opening into a plurality of small opening portions. The grid member has a first portion, a second portion of a smaller width than the first portion, and a third portion of a smaller width than the second portion. The distance between the first portion and a center of the opening is greater than the distance between the second portion and the center of the opening. The distance between the second portion and the center of the opening is greater than the distance between the third portion and the center of the opening.

In this radiation transmissive window, the numerical aperture can be improved by making the third portion smaller in width than the second portion and making the second portion smaller in width than the first portion. Therefore, this radiation transmissive window can have improved radiation transmissivity.

Another aspect of the radiation transmissive window associated with the present invention comprises: an outer frame having an opening; a radiation transmissive film closing off the opening; and a grid member that partitions the opening into a plurality of small opening portions. The grid member has a first portion, a second portion of a smaller width than the first portion, and a third portion of a smaller width than the second portion. The distance between the first portion and a center of the opening is smaller than the distance between the second portion and the center of the opening. The distance between the second portion and the center of the opening is smaller than the distance between the third portion and the center of the opening.

In this radiation transmissive window, the numerical aperture can be improved by making the third portion smaller in width than the second portion and making the second portion smaller in width than the first portion. Therefore, this radiation transmissive window can have improved radiation transmissivity.

Aspects of the radiation detector associated with the present invention include the above-described aspects of the radiation transmissive window.

DETAILED DESCRIPTION OF THE INVENTION

The preferred embodiments of the present invention are hereinafter described in detail with reference to the drawings. It is to be understood that the embodiments provided below do not unduly restrict the scope and content of the present invention delineated by the appended claims and that not all the configurations described below are essential constituent components of the invention.

Also, it is to be understood that in the following description, X-ray transmissive windows each having an X-ray transmissive film that transmits X-rays are taken as examples of the radiation transmissive window associated with the present invention. Radiation transmissive windows associated with the present invention may also be windows equipped with a transmissive film that transmits radiations other than X-rays such as γ (gamma) rays.

Furthermore, it is to be understood that in the following description, X-ray detectors each equipped with an X-ray transmissive window are taken as examples of the radiation detector associated with the present invention. The radiation detector associated with the present invention may also be a detector having a radiation transmissive window that transmits radiations other than X-rays such as γ (gamma) rays.

1. First Embodiment

1.1. X-Ray Transmissive Window

Figure 1:
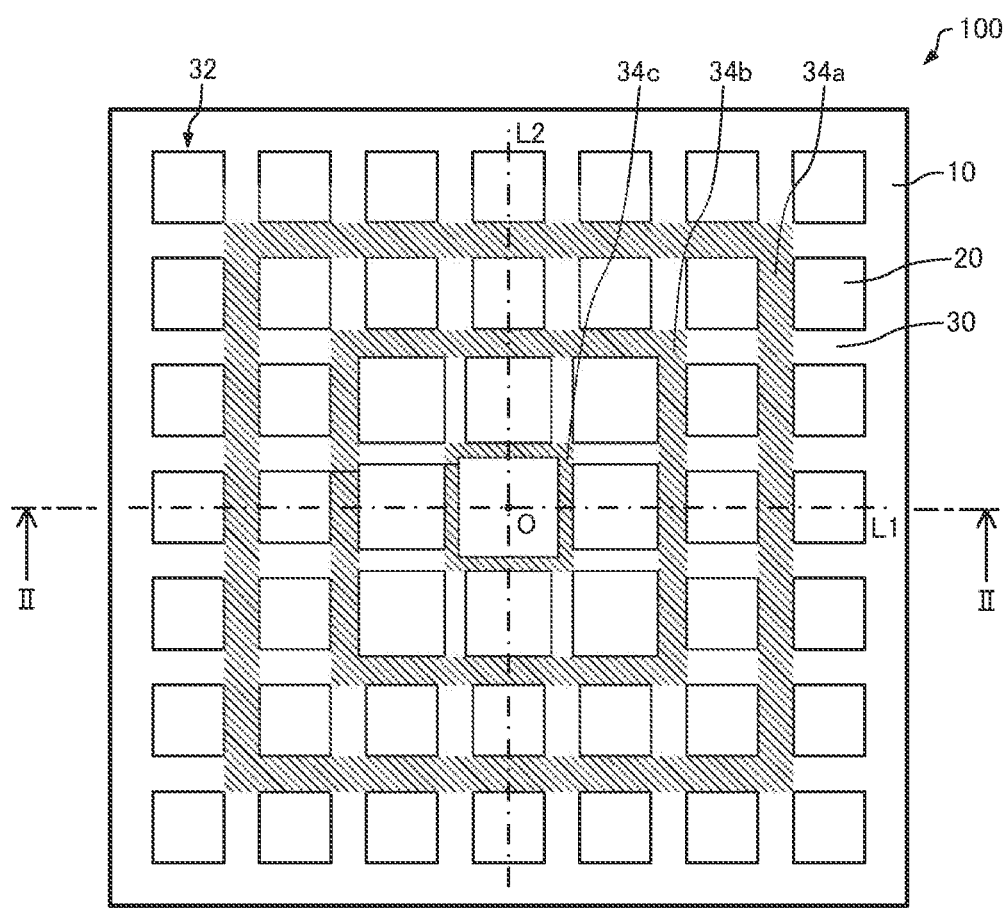
FIG. 1 is a schematic plan view of an X-ray transmissive window associated with a first embodiment of the present invention.
Figure 2:
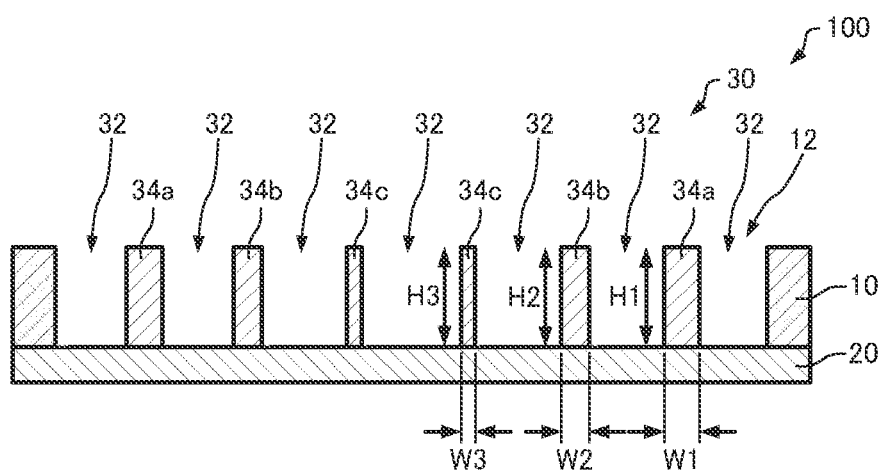
FIG. 2 is a schematic cross-sectional view of the X-ray transmissive window shown in FIG. 1.

First, an X-ray transmissive window associated with a first embodiment is described by referring to FIGS. 1 and 2. FIG. 1 is a schematic plan view of the X-ray transmissive window, 100, associated with the first embodiment. FIG. 2 is a schematic cross-sectional view of the X-ray transmissive window 100, taken on line II-II of FIG. 1.

As shown in FIG. 1, the X-ray transmissive window 100 includes an outer frame 10, an X-ray transmissive film 20, and a grid member 30.

The outer frame 10 has an opening 12 that is closed off by the X-ray transmissive film 20. The outer frame 10 supports the X-ray transmissive film 20. The opening 12 is square in planar shape in the example shown in FIG. 1. Each side of the opening 12 has a length, for example, from on the order of millimeters to tens of millimeters. No restriction is imposed on the planar shape of the opening 12. It may also be circular or polygonal. The material of the outer frame 10 is single-crystal silicon, polycrystalline silicon, amorphous silicon, carbon fiber impregnated resin, graphite, or the like.

The X-ray transmissive film 20 is supported to the outer frame 10 and made of a material that transmits X-rays. The material of the X-ray transmissive film 20 is graphene, silicon nitride, a metallic material (e.g., beryllium), or high-polymer material, for example. The X-ray transmissive film 20 has a film thickness of tens of nm to hundreds of nm, for example.

The grid member 30 partitions the opening 12 into a plurality of small opening portions 32, thus dispersing the pressure applied to the X-ray transmissive film 20. The material of the grid member 30 is single-crystal silicon, polycrystalline silicon, amorphous silicon, carbon fiber-impregnated resin, or graphite, for example. The material of the grid member 30 may be identical to that of the outer frame 10.

Each small opening portion 32 is a square whose each side is approximately hundreds of micrometers in length. The small opening portions 32 are arranged in rows and columns. In the illustrated example, the small opening portions 32 are arranged in 7 rows and 7 columns. The small opening portions 32 are equally spaced from each other both in the direction of rows and in the direction of columns. The small opening portions 32 are at intervals of approximately 500 μm, for example, in the direction of rows and at intervals of approximately 500 μm, for example, in the direction of columns. The intervals between the small opening portions 32 are the center-to-center distances between the adjacent ones of the small opening portions 32. Note that no restriction is imposed on the shape of the small opening portions 32. They may also be polygonal (such as rectangular or hexagonal), circular, or elliptical in shape. Furthermore, the arrangement of the small opening portions 32 is not restricted to a row and column arrangement. For example, they may be arranged concentrically.

The grid member 30 has a first portion 34a, a second portion 34b, and a third portion 34c which are different in width. The width W2 of the second portion 34b is smaller than the width W1 of the first portion 34a. The width W3 of the third portion 34c is smaller than the width W2 of the second portion 34b. In the illustrated example, the first portion 34a is the widest portion of the grid member 30, and the third portion 34c is the narrowest portion of the grid member 30.

The distance between the first portion 34a and the center O of the opening 12 is greater than the distance between the second portion 34b and the center O of the opening 12. The distance between the second portion 34b and the center O of the opening 12 is greater than the distance between the third portion 34c and the center O of the opening 12.

The first portion 34a surrounds the second portion 34b. The second portion 34b surrounds the third portion 34c. The third portion 34c surrounds the center O of the opening 12.

In the illustrated example, the first portion 34a surrounds 25 small opening portions 32. The second portion 34b surrounds 9 small opening portions 32. The third portion 34c surrounds one small opening portion 32. That is, 16 small opening portions 32 are located between the first portion 34a and the second portion 34b. Eight small opening portions 32 reside between the second portion 34b and the third portion 34c.

As described above, the width W2 of the second portion 34b is smaller than the width W1 of the first portion 34a, and the width W3 of the third portion 34c is smaller than the width W2 of the second portion 34b. Therefore, the area of each small opening portion 32 present between the second portion 34b and the third portion 34c is greater than the area of each small opening portion 32 present between the first portion 34a and the second portion 34b. Furthermore, the small opening portion 32 surrounded by the third portion 34c is greater in area than each small opening portion 32 present between the second portion 34b and the third portion 34c.

Each small opening portion 32 between the first portion 34a and the second portion 34b is equal in area to each small opening portion 32 between the first portion 34a and the outer frame 10. Alternatively, each small opening portion 32 between the first portion 34a and the second portion 34b may be greater in area than each small opening portion 32 between the first portion 34a and the outer frame 10.

In the X-ray transmissive window 100, if a virtual straight line L1 is drawn which passes through the center O of the opening 12 and which extends parallel to the direction of rows, the virtual line L1 intersects a widthwise extent of the grid member 30 which decreases with decreasing distance to the center O. Also, in the X-ray transmissive window 100, if another virtual straight line L2 is drawn which passes through the center O of the opening 12 and which runs parallel to the direction of columns, the virtual line L2 intersects a widthwise extent of the grid member 30 which decreases with decreasing distance to the center O.

Furthermore, in the X-ray transmissive window 100, if the virtual line L1 is drawn, within the area between the center O of the opening 12 and the first portion 34a, the virtual line L1 intersects each small opening portion 32 of a greater area with decreasing distance to the center O. Within the area between the center O of the opening 12 and the outer frame 10, the virtual line L1 may intersect each small opening portion 32 of a greater area with decreasing distance to the center O in a manner not illustrated.

In addition, in the X-ray transmissive window 100, if the virtual line L2 is drawn, the virtual line L2 intersects each small opening portion 32 of a greater area with decreasing distance to the center O within the area between the center O of the opening 12 and the first portion 34a. Note that between the center O of the opening 12 and the outer frame 10, the virtual line L2 may intersect each small opening portion 32 of a greater area with decreasing distance to the center O in a manner not illustrated.

The first portion 34a, second portion 34b, and third portion 34c have heights H1, H2, and H3, respectively, which are equal to each other. The grid member 30 has a constant height.

The X-ray transmissive window 100 has the following advantages. In the X-ray transmissive window 100, the grid member 30 has the first portion 34a, the second portion 34b of a smaller width than the first portion 34a, and the third portion 34c of a smaller width than the second portion 34b. Therefore, the X-ray transmissive window 100 can provide improved numerical aperture, for example, over the case where the width of the grid member 34 is constant and equal to the width of the first portion 34a. Hence, the X-ray transmissive window 100 can provide improved X-ray transmissivity.

The numerical aperture is the ratio of the difference (SA−SB) between the area SA of the opening 12 and the area SB of the grid member 30 to the area SA of the opening 12 in planar view, i.e., given by (SA−SB)/SA. The numerical aperture is one of factors representing the degree to which X-rays are transmitted.

If the width of the grid member 30 is reduced, the mechanical strength of the grid member 30 will decrease. Therefore, as noted above, by providing the second portion 34b and the third portion 34c, the central portion of the grid member 30 closer to the center O of the opening 12 is lower in mechanical strength than the end portion of the grid member 30 remote from the center O of the opening 12.

However, the mechanical strength that the grid member 30 is required to exhibit differs from location to location. For example, where the grid member 30 is made of a material having relatively high rigidity, the overall mechanical strength of the grid member 30 can be enhanced efficiently by increasing the mechanical strength of the end portion of the grid member 30. In this way, the X-ray transmissive window 100 is especially effective where the end portion of the grid member 30 is required to exhibit higher mechanical strength than the central portion of the grid member 30.

1.2. Method of Fabricating X-Ray Transmissive Window

Figure 3:
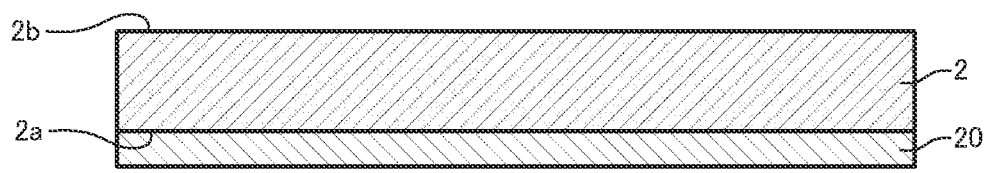
FIGS. 3 and 4 are schematic cross-sectional views illustrating process steps of fabricating the X-ray transmissive window of FIGS. 1 and 2.
Figure 4:
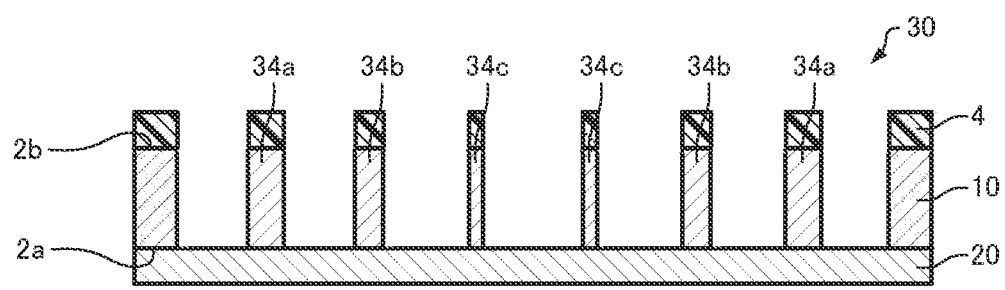

FIGS. 3 and 4 are schematic cross-sectional views illustrating process steps of fabricating the X-ray transmissive window 100. As shown in FIG. 3, the X-ray transmissive film 20 is deposited on a first surface 2a of a substrate 2. In this example, an Si substrate is used as the substrate 2 and a silicon nitride film is used as the X-ray transmissive film 20. The deposition of the X-ray transmissive film 20 is performed by CVD (chemical vapor deposition) or other method.

As shown in FIG. 4, the substrate 2 is patterned photolithographically to form the outer frame 10 and the grid member 30. For example, a resist 4 is first deposited as a film on a second surface 2b of the substrate 2 on the opposite side of the first surface 2a. Then, the resist 4 is photolithographically patterned. Using the patterned resist 4 as a mask, the substrate 2 is etched. Consequently, the outer frame 10 and the grid member 30 can be defined. After the patterning of the substrate 2, the resist 4 is removed. Because of the process steps described above, the X-ray transmissive window 100 can be fabricated.

2. Second Embodiment 2.1. X-Ray Transmissive Window

Figure 5:
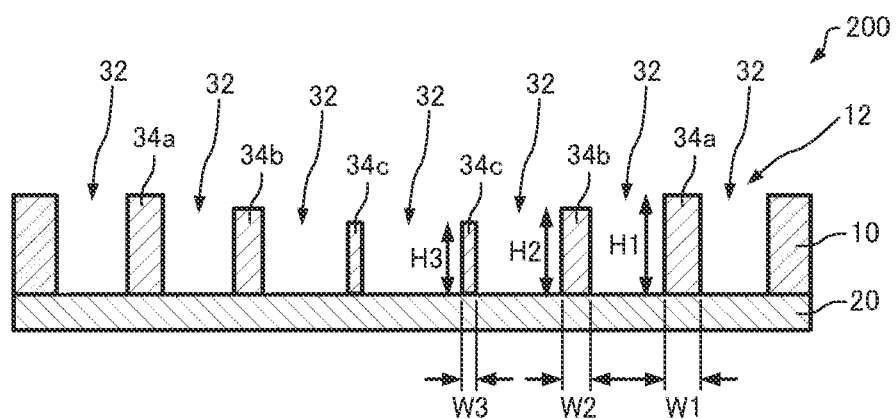
FIG. 5 is a schematic cross-sectional view of an X-ray transmissive window associated with a second embodiment.

An X-ray transmissive window associated with a second embodiment is next described by referring to FIG. 5, which is a schematic cross-sectional view of the X-ray transmissive window, 200, associated with the second embodiment. The X-ray transmissive window 200 is similar in planar form to the X-ray transmissive window 100 shown in FIG. 1 and so its planar form is omitted from being shown. Those members of the X-ray transmissive window 200 associated with the second embodiment which are similar in function to their counterparts of the X-ray transmissive window 100 associated with the first embodiment are indicated by the same reference numerals as in the foregoing figures and a detailed description thereof is omitted.

In the above-described X-ray transmissive window 100, as shown in FIG. 2, the height H1 of the first portion 34a, the height H2 of the second portion 34b, and the height H3 of the third portion 34c are all equal to each other.

On the other hand, in the X-ray transmissive window 200, as shown in FIG. 5, the height H3 of the third portion 34c is smaller than the height H2 of the second portion 34b, and the height H2 of the second portion 34b is smaller than the height H1 of the first portion 34a.

In the X-ray transmissive window 200, if a virtual straight line L1 is drawn, the virtual line L1 intersects the grid member 30 at a height that decreases with decreasing distance to the center O. Furthermore, if a virtual straight line L2 is drawn, the virtual line L2 intersects the grid member 30 at a height that decreases with decreasing distance to the center O. For example, the relationship between the height of the grid member 30 and the distance to the center O is given by a linear function.

In the X-ray transmissive window 200, the height H3 of the third portion 34c is smaller than the height H2 of the second portion 34b. The height H2 of the second portion 34b is smaller than the height H1 of the first portion 34a. In this way, the X-ray transmissive window 200 can provide improved X-ray transmissivity by making the height H3 of the third portion 34c smaller than the height H2 of the second portion 34b and making the height H2 of the second portion 34b smaller than the height H1 of the first portion 34a, for example, over the case where the height of the grid member 30 is equal to the height H1 of the first portion 34a and constant, for the following reason.

Figure 6:
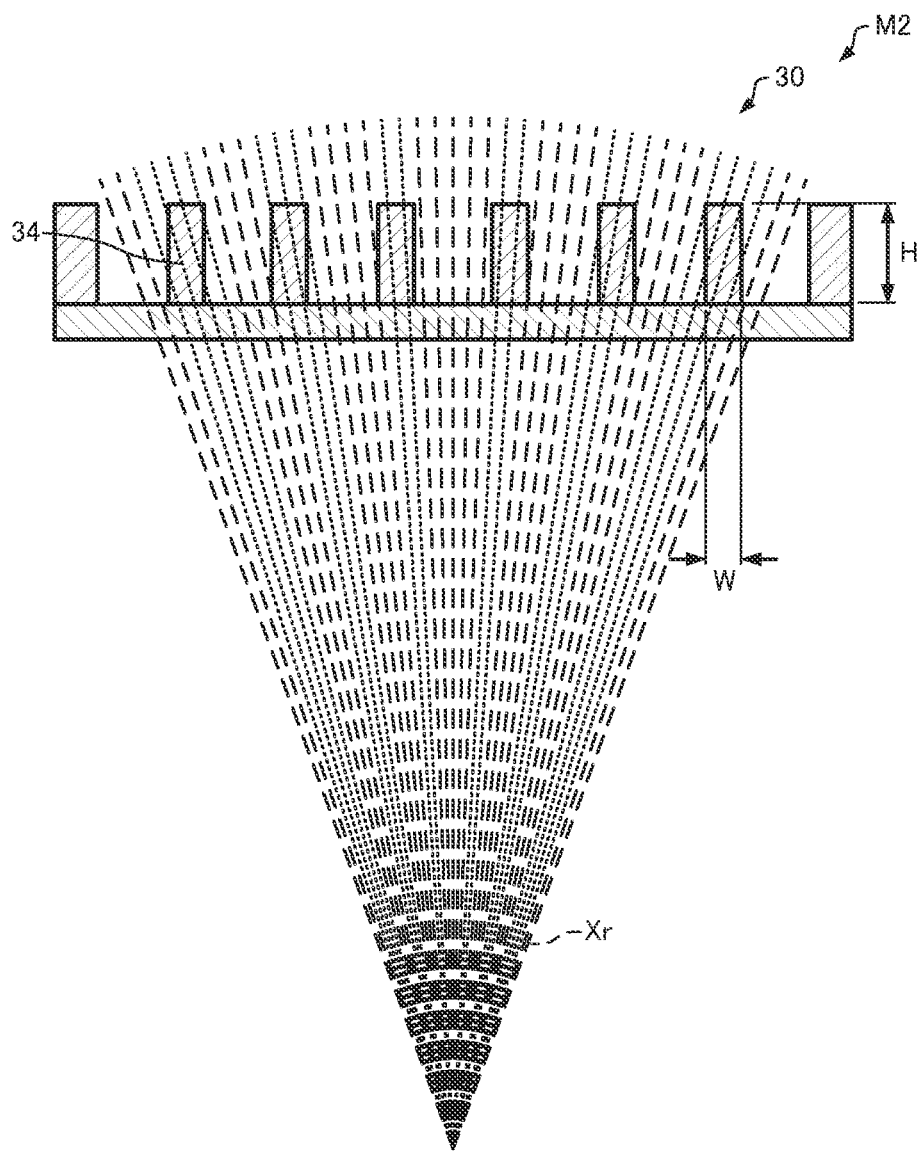
FIG. 6 is a diagram illustrating a relationship between the height of a grid member and X-ray transmissivity for a model M2.
Figure 7:
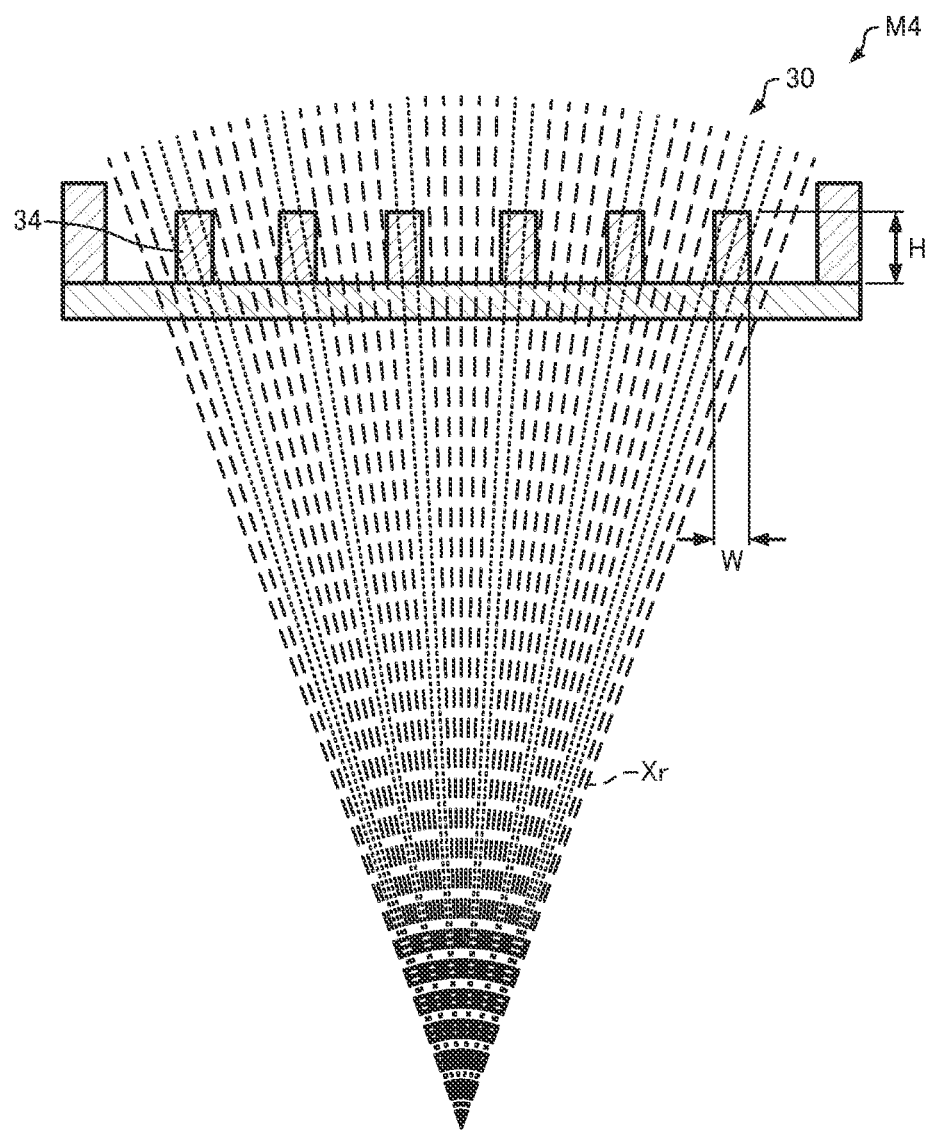
FIG. 7 is a diagram illustrating a relationship between the height of a grid member and X-ray transmissivity for a model M4.

FIGS. 6 and 7 are diagrams illustrating the relationship between the height of the grid member 30 and the X-ray transmissivity by introducing models M2 and M4, respectively, of the grid member. The models M2 and M4 illustrated in FIGS. 6 and 7, respectively, are similar in configuration except that the height H of the grid member 30 of the model M2 is greater than the height H of the grid member 30 of the model M4.

As described previously, the numerical aperture is given by the ratio of the difference (SA−SB) between the area SA of the opening 12 and the area SB of the grid member 30 to the area SA of the opening 12 in planar view, i.e., (SA−SB)/SA. Therefore, the models M2 and M4 are identical in numerical aperture.

However, as shown in FIGS. 6 and 7, X-rays Xr are radiated radially from a sample and thus blocked by the sidewalls of the grid member 30. Consequently, the X-ray transmissivity of the model M4 whose grid member 30 has a smaller height is higher than that of the model M2 whose grid member 30 has a greater height.

In this way, if the numerical aperture is the same, the X-ray transmissivity can be improved by reducing the height of the grid member 30. Accordingly, in the X-ray transmissive window 200, the X-ray transmissivity can be improved by making the height H3 of the third portion 34c smaller than the height H2 of the second portion 34b and making the height H2 of the second portion 34b smaller than the height H1 of the first portion 34a.

Furthermore, in the X-ray transmissive window 200, the width W3 of the third portion 34c is smaller than the width W2 of the second portion 34b and the width W2 of the second portion 34b is smaller than the width W1 of the first portion 34a in the same manner as in the X-ray transmissive window 100. Therefore, the window 200 can have improved X-ray transmissivity.

Reducing the height of the grid member 30 results in a decrease in the mechanical strength of the grid member 30. Therefore, as noted above, the central portion of the grid member 30 is made lower in mechanical strength than the end portion of the grid member 30 by making the height H3 of the third portion 34c smaller than the height H2 of the second portion 34b and making the height H2 of the second portion 34b smaller than the height H1 of the first portion 34a. In spite of this, in the X-ray transmissive window 200, the mechanical strength of the whole grid member 30 can be efficiently enhanced by increasing the mechanical strength of the end portion of the grid member 30 in the same manner as for the X-ray transmissive window 100.

2.2. Method of Fabricating X-Ray Transmissive Window

The method of fabricating the X-ray transmissive window 200 involves the process step of fabricating the grid member 30 by photolithographically patterning the substrate 2. During this step, the height H3 of the third portion 34c is made smaller than the height H2 of the second portion 34b and the height H2 of the second portion 34b is made smaller than the height H1 of the first portion 34a by etching the first portion 34a, second portion 34b, and third portion 34c by different amounts.

As an example, the substrate 2 is first etched to a depth flush with the top surface of the first portion 34a. Then, the first portion 34a is coated with a resist. Thereafter, the substrate 2 is etched to a depth flush with the top surface of the second portion 34b, and the second portion 34b is covered with a resist. The substrate 2 is then etched to a depth flush with the top surface of the third portion 34c, and the third portion 34c is covered. Then, the substrate 2 is etched until the X-ray transmissive film 20 is exposed. Consequently, the grid member 30 having the first portion 34a, second portion 34b, and third portion 34c can be formed. The other process steps are similar to their counterparts of the process of fabricating the X-ray transmissive window 100.

3. Third Embodiment 3.1. X-Ray Transmissive Window

Figure 8:
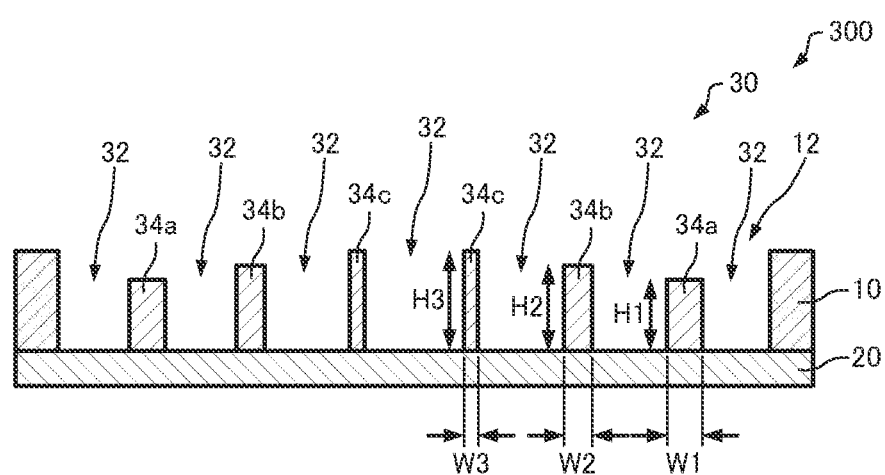
FIG. 8 is a schematic cross-sectional view of an X-ray transmissive window associated with a third embodiment.

An X-ray transmissive window associated with a third embodiment is next described by referring to FIG. 8, which is a schematic cross-sectional view of the X-ray transmissive window, 300, associated with the third embodiment. The planar form of the X-ray transmissive window 300 is similar to that of the X-ray transmissive window 100 shown in FIG. 1 and is omitted here from being shown. Those members of the X-ray transmissive window 300 which are similar in function to their counterparts of the X-ray transmissive window 100 associated with the first embodiment are indicated by the same reference numerals as in the foregoing figures and a detailed description thereof is omitted.

In the above-described X-ray transmissive window 100, the height H1 of the first portion 34a, the height H2 of the second portion 34b, and the height H3 of the third portion 34c are equal to each other as shown in FIG. 2.

On the other hand, in the X-ray transmissive window 300, as shown in FIG. 8, the height H1 of the first portion 34a is smaller than the height H2 of the second portion 34b, and the height H2 of the second portion 34b is smaller than the height H3 of the third portion 34c.

In the X-ray transmissive window 300, if a virtual straight line L1 is drawn, the virtual line L1 intersects the grid member 30 at a height that decreases with decreasing distance to the center O. Furthermore, in the X-ray transmissive window 300, if a virtual straight line L2 is drawn, the virtual line L2 intersects the grid member 30 at a height that decreases with increasing distance to the center O. For example, the relationship between the height of the grid member 30 and the distance to the center O is given by a linear function.

In the X-ray transmissive window 300, the height H1 of the first portion 34a is smaller than the height H2 of the second portion 34b, and the height H2 of the second portion 34b is smaller than the height H3 of the third portion 34c. In this way, in the X-ray transmissive window 300, the X-ray transmissivity can be improved efficiently by making the height H1 of the first portion 34a smaller than the height H2 of the second portion 34b and making the height H2 of the second portion 34b smaller than the height H3 of the third portion 34c, for the reason described below.

As shown in FIGS. 6 and 7, the end portion of the grid member 30 has an X-ray transmissivity which varies at a higher rate than the central portion of the grid member 30 as the height is varied. That is, the X-ray transmissivity can be improved better when the height of the end portion of the grid member 30 is reduced than when the height of the central portion of the grid member 30 is reduced. Accordingly, the X-ray transmissivity can be improved efficiently by making the height H1 of the first portion 34a smaller than the height H2 of the second portion 34b and making the height H2 of the second portion 34b smaller than the height H3 of the third portion 34c.

The X-ray transmissive window 300 has the first portion 34a, the second portion 34b of a smaller width than the first portion 34a, and the third portion 34c of a smaller width than the second portion 34b in the same manner as the X-ray transmissive window 100. Therefore, the central portion of the grid member 30 is lower in mechanical strength than the end portion of the grid member 30. In the X-ray transmissive window 300, however, the central portion of the grid member 30 can be improved in mechanical strength over the end portion of the grid member 30 by making the height H1 of the first portion 34a smaller than the height H2 of the second portion 34b and making the height H2 of the second portion 34b smaller than the height H3 of the third portion 34c. Consequently, in the X-ray transmissive window 300, the mechanical strength of the whole grid member 30 can be improved with a good balance.

3.2. Method of Fabricating X-Ray Transmissive Window

A method of fabricating the X-ray transmissive window 300 includes the process step of photolithographically patterning the substrate 2 to form the grid member 30 in the same way as the method of fabricating the X-ray transmissive window 200. During this process step, the height H1 of the first portion 34a is made lower than the height H2 of the second portion 34b and the height H2 of the second portion 34b is made lower than the height H3 of the third portion 34c by making different the amounts by which the first portion 34a, second portion 34b, and third portion 34c are etched. The other process steps are similar to their counterparts of the method of fabricating the X-ray transmissive window 100.

4. Fourth Embodiment

4.1. X-Ray Transmissive Window

Figure 9:
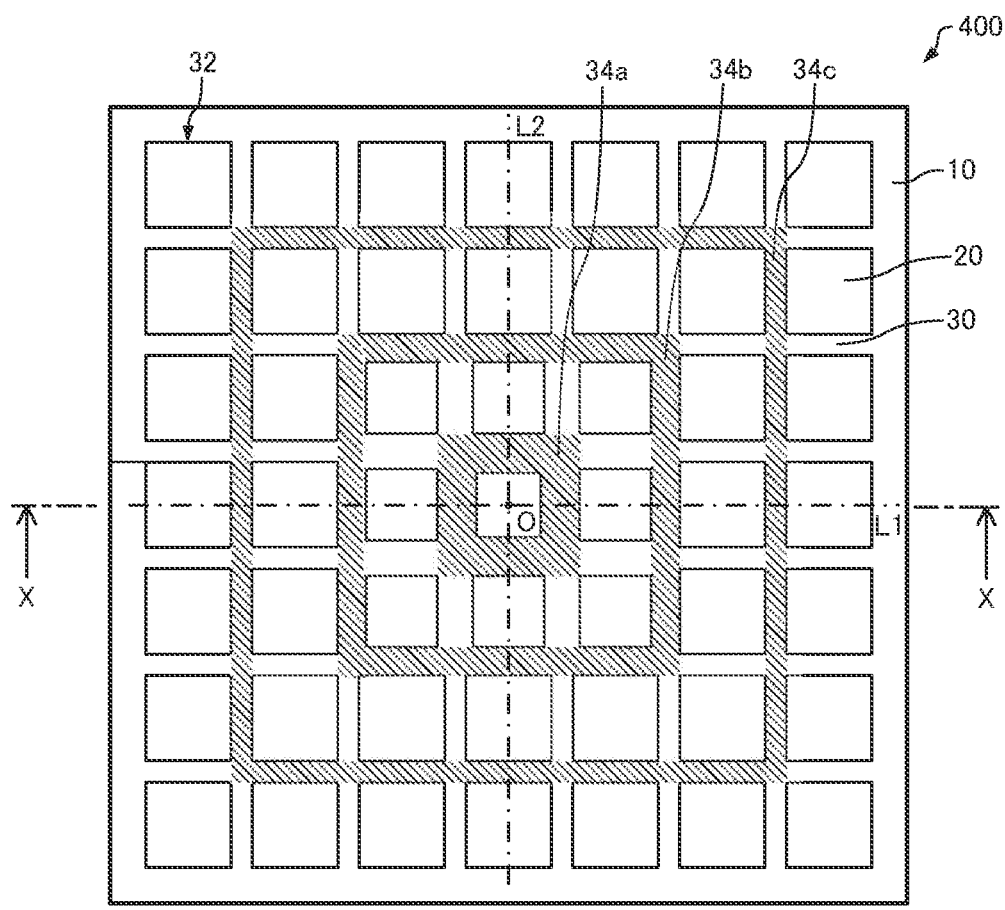
FIG. 9 is a schematic plan view of an X-ray transmissive window associated with a fourth embodiment.
Figure 10:
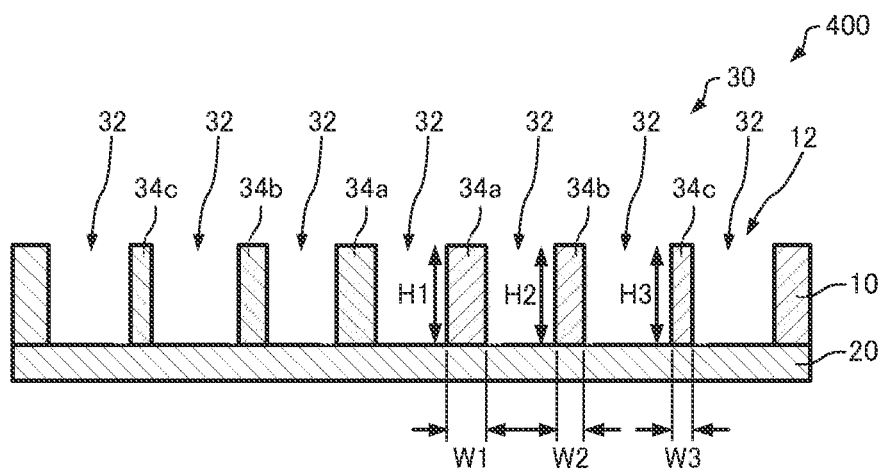
FIG. 10 is a schematic cross-sectional view of the X-ray transmissive window shown in FIG. 9.

An X-ray transmissive window associated with a fourth embodiment is next described by referring to FIG. 9, which is a schematic plan view of the X-ray transmissive window, 400, associated with the fourth embodiment. FIG. 10 is a schematic cross-sectional view of the X-ray transmissive window 400, taken on line X-X of FIG. 9.

Those members of the X-ray transmissive window 400 associated with the fourth embodiment which are similar in function with their counterparts of the X-ray transmissive window 100 associated with the first embodiment are indicated by the same reference numerals as in the foregoing figures and a detailed description thereof is omitted.

In the above-described X-ray transmissive window 100, as shown in FIGS. 1 and 2, the grid member 30 has the first portion 34a, the second portion 34b of a smaller width than the first portion 34a, and the third portion 34c of a smaller width than the second portion 34b. The distance between the first portion 34a and the center O of the opening 12 is greater than the distance between the second portion 34b and the center O of the opening 12. The distance between the second portion 34b and the center O of the opening 12 is greater than the distance between the third portion 34c and the center O of the opening 12.

On the other hand, in the X-ray transmissive window 400, as shown in FIGS. 9 and 10, the grid member 30 has the first portion 34a, the second portion 34b of a smaller width than the first portion 34a, and the third portion 34c of a smaller width than the second portion 34b. The distance between the first portion 34a and the center O of the opening 12 is smaller than the distance between the second portion 34b and the center O of the opening 12. The distance between the second portion 34b and the center O of the opening 12 is smaller than the distance between the third portion 34c and the center O of the opening 12.

The third portion 34c surrounds the second portion 34b. The second portion 34b surrounds the first portion 34a. The first portion 34a surrounds the center O of the opening 12.

In the illustrated example, the third portion 34c surrounds 25 small opening portions 32. The second portion 34b surrounds 9 small opening portions 32. The first portion 34a surrounds one small opening portion 32. That is, 16 small opening portions 32 are located between the second portion 34b and the third portion 34c. Eight small opening portions 32 are present between the first portion 34a and the second portion 34b.

As described above, the width W2 of the second portion 34b is smaller than the width W1 of the first portion 34a. The width W3 of the third portion 34c is smaller than the width W2 of the second portion 34b. Therefore, the area of each small opening portion 32 between the second portion 34b and the third portion 34c is greater than the area of each small opening portion 32 between the first portion 34a and the second portion 34b. Also, the area of each small opening portion 32 between the first portion 34a and the second portion 34b is greater than the area of the small opening portion 32 surrounded by the first portion 34a.

In the X-ray transmissive window 400, if a virtual straight line L1 is drawn, the virtual line L1 intersects a widthwise extent of the grid member 30 which decreases with increasing distance to the center O. If a virtual straight line L2 is drawn, the virtual line L2 intersects a widthwise extent of the grid member 30 which decreases with increasing distance to the center O.

In the X-ray transmissive window 400, if the virtual straight line L1 is drawn, within the area between the center O of the opening portion 12 and the third portion 34c, the virtual line L1 intersects the small opening portions 32 of successively greater areas with increasing distance to the center O. Furthermore, if the virtual straight line L2 is drawn, within the area between the center O of the opening 12 and the third portion 34c, the virtual line L2 intersects the small opening portions 32 of successively greater areas with increasing distance to the center O.

The height H1 of the first portion 34a, the height H2 of the second portion 34b, and the height H3 of the third portion 34c are equal to each other. The height of the grid member 30 is constant.

The X-ray transmissive window 400 yields the following advantages. In the X-ray transmissive window 400, the grid member 30 has the first portion 34a, the second portion 34b of a smaller width than the first portion 34a, and the third portion 34c of a smaller width than the second portion 34b in the same manner as in the X-ray transmissive window 100. Therefore, the X-ray transmissive window 400 can provide improved numerical aperture and improved X-ray transmissivity.

Reducing the width of the grid member 30 results in a decrease in the mechanical strength of the grid member 30. Since there are the second portion 34b and the third portion 34c as described above, the end portion of the grid member 30 is lower in mechanical strength than the central portion of the grid member 30.

However, the required mechanical strength of the grid member 30 differs from location to location.

4.2. Method of Fabricating X-Ray Transmissive Window

The method of fabricating the X-ray transmissive window 400 includes the process step of photolithographically patterning the substrate 2 to fabricate the grid member 30. This patterning step is performed such that the distance between the first portion 34a and the center O of the opening 12 is smaller than the distance between the second portion 34b and the center O of the opening 12 and that the distance between the second portion 34b and the center O of the opening 12 is smaller than the distance between the third portion 34c and the center O of the opening 12. The other process steps are similar to their counterparts of the above-described method of fabricating the X-ray transmissive window 100.

5. Fifth Embodiment

5.1. X-Ray Transmissive Window

Figure 11:
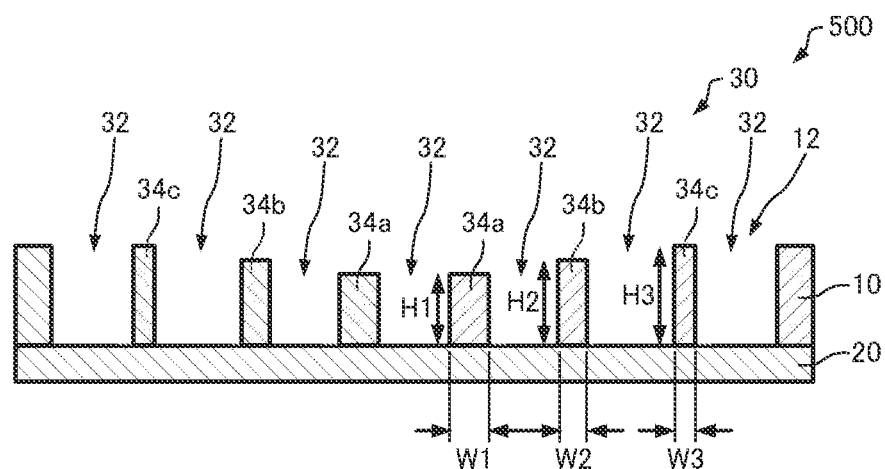
FIG. 11 is a schematic cross-sectional view of an X-ray transmissive window associated with a fifth embodiment.

An X-ray transmissive window associated with a fifth embodiment is next described by referring to FIG. 11, which is a schematic cross-sectional view of the X-ray transmissive window, 500, associated with the fifth embodiment. The planar form of the X-ray transmissive window 500 is similar to that of the X-ray transmissive window 400 shown in FIG. 9 and omitted from being shown. Those members of the X-ray transmissive window 500 which are similar in function to their counterparts of the X-ray transmissive window 400 associated with the fourth embodiment are indicated by the same reference numerals as in the foregoing figures and a detailed description thereof is omitted.

In the above-described X-ray transmissive window 400, as shown in FIG. 10, the height H1 of the first portion 34a, the height H2 of the second portion 34b, and the height H3 of the third portion 34c are equal to each other.

In contrast, in the X-ray transmissive window 500, as shown in FIG. 11, the height H1 of the first portion 34a is smaller than the height H2 of the second portion 34b, and the height H2 of the second portion 34b is smaller than the height H3 of the third portion 34c.

In the X-ray transmissive window 500, if a virtual straight line L1 is drawn, the virtual line L1 intersects the grid member 30 at a height that decreases with decreasing distance to the center O. Also, if a virtual straight line L2 is drawn, the virtual line L2 intersects the grid member 30 at a height that decreases with increasing distance to the center O. For example, the relationship between the height of the grid member 30 and the distance to the center O is given by a linear function.

In the X-ray transmissive window 500, the height H1 of the first portion 34a is smaller than the height H2 of the second portion 34b, and the height H2 of the second portion 34b is smaller than the height H3 of the third portion 34c. In this way, the X-ray transmissive window 500 can have improved X-ray transmissivity by making the height H1 of the first portion 34a smaller than the height H2 of the second portion 34b and making the height H2 of the second portion 34b smaller than the height H3 of the third portion 34c in the same manner as for the X-ray transmissive window 200.

Furthermore, in the X-ray transmissive window 500, the width W3 of the third portion 34c is smaller than the width W2 of the second portion 34b, and the width W2 of the second portion 34b is smaller than the width W1 of the first portion 34a in the same manner as in the X-ray transmissive window 100. Therefore, the X-ray transmissive window 500 can have improved X-ray transmissivity.

The X-ray transmissive window 500 has the first portion 34a, the second portion 34b of a smaller width than the first portion 34a, and the third portion 34c of a smaller width than the second portion 34b in the same manner as the X-ray transmissive window 400. Therefore, the end portion of the grid member 30 is lower in mechanical strength than the central portion of the grid member 30. However, in the X-ray transmissive window 500, the end portion of the grid member 30 can be enhanced in mechanical strength compared with the central portion of the grid member 30 by making the height H1 of the first portion 34a smaller than the height H2 of the second portion 34b and making the height H2 of the second portion 34b smaller than the height H3 of the third portion 34c. Consequently, in the X-ray transmissive window 500, the mechanical strength of the whole grid member 30 can be improved with a good balance.

5.2. Method of Fabricating X-Ray Transmissive Window

The method of fabricating the X-ray transmissive window 500 includes the process step of fabricating the grid member 30 by photolithographically patterning the substrate 2. During this process step, the height H1 of the first portion 34a is made smaller than the height H2 of the second portion 34b and making the height H2 of the second portion 34b smaller than the height H3 of the third portion 34c by making different the amounts by which the first portion 34a, second portion 34b, and third portion 34c are respectively etched. The other process steps are similar to those of the method of fabricating the X-ray transmissive window 400.

6. Sixth Embodiment 6.1. X-Ray Transmissive Window

Figure 12:
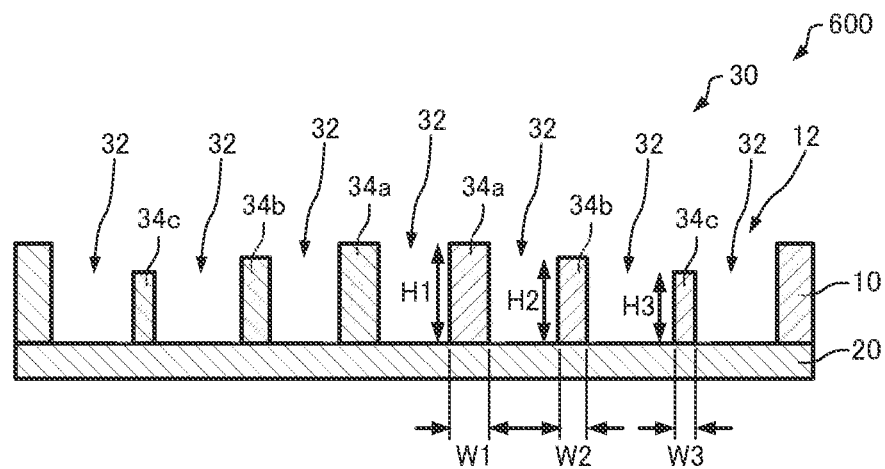
FIG. 12 is a schematic cross-sectional view of an X-ray transmissive window associated with a sixth embodiment.

An X-ray transmissive window associated with a sixth embodiment is next described by referring to FIG. 12, which is a schematic cross-sectional view of the X-ray transmissive window, 600, associated with the sixth embodiment. The planar form of the X-ray transmissive window 600 is similar to that of the X-ray transmissive window 400 shown in FIG. 9 and is omitted from being shown. Those members of the X-ray transmissive window 600 which are similar in function with their counterparts of the X-ray transmissive window 400 associated with the fourth embodiment are hereinafter indicated by the same reference numerals as in the foregoing figures and a detailed description thereof is omitted.

In the above-described X-ray transmissive window 400, as shown in FIG. 10, the height H1 of the first portion 34a, the height H2 of the second portion 34b, and the height H3 of the third portion 34c are equal to each other. On the other hand, in the X-ray transmissive window 600, as shown in FIG. 12, the height H3 of the third portion 34c is smaller than the height H2 of the second portion 34b, and the height H2 of the second portion 34b is smaller than the height H1 of the first portion 34a.

In the X-ray transmissive window 600, if a virtual straight line L1 is drawn, the virtual line L1 intersects the grid member 30 at a height that decreases with increasing distance to the center O. Also, if a virtual straight line L2 is drawn, the virtual line L2 intersects the grid member 30 at a height that decreases with increasing distance to the center O. For example, the relationship between the height of the grid member 30 and the distance to the center O is given by a linear function.

In the X-ray transmissive window 600, the height H3 of the third portion 34c is smaller than the height H2 of the second portion 34b, and the height H2 of the second portion 34b is smaller than the height H1 of the first portion 34a. In this way, the X-ray transmissivity of the X-ray transmissive window 600 can be improved efficiently by making the height H3 of the third portion 34c smaller than the height H2 of the second portion 34b and making the height H2 of the second portion 34b smaller than the height H1 of the first portion 34a in the same manner as for the X-ray transmissive window 300.

Furthermore, the X-ray transmissivity of the X-ray transmissive window 600 can be improved by making the width W3 of the third portion 34c smaller than the width W2 of the second portion 34b and making the width W2 of the second portion 34b smaller than the width W1 of the first portion 34a, in the same manner as for the X-ray transmissive window 400.

6.2. Method of Fabricating X-Ray Transmissive Window

The method of fabricating the X-ray transmissive window 600 involves the process step of photolithographically patterning the substrate 2 to form the grid member 30 in the same manner as the method of fabricating the X-ray transmissive window 500. During this process step, the height H3 of the third portion 34c is made smaller than the height H2 of the second portion 34b and the height H2 of the second portion 34b is made smaller than the height H1 of the first portion 34a by making different the amounts by which the first portion 34a, second portion 34b, and third portion 34c are respectively etched. The other process steps are similar to those of the method of fabricating the X-ray transmissive window 400.

7. Seventh Embodiment

Figure 13:
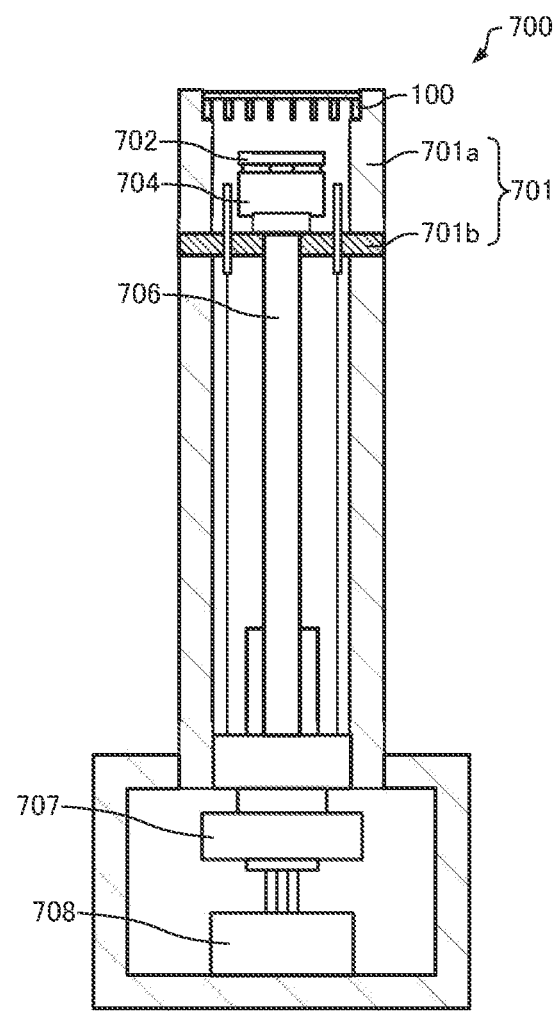
FIG. 13 is a schematic vertical cross-sectional view of an X-ray detector associated with a seventh embodiment.

An X-ray detector associated with a seventh embodiment is next described by referring to FIG. 13, which shows the configuration of the X-ray detector, 700. The X-ray detector 700 includes the X-ray transmissive window 100. Alternatively, the X-ray detector 700 may include any one of the X-ray transmissive windows 200, 300, 400, 500, and 600.

As shown in FIG. 13, the X-ray detector 700 includes an enclosure 701, a detecting element 702, a cooling element 704, a heat pipe 706, a signal transmission circuit 707, and a signal amplification circuit 708.

The enclosure 701 defines a space for accommodating the detecting element 702 and the cooling element 704. The interior of the enclosure 701 is in a vacuum state. The enclosure 701 has a cap 701a and a terminal board 701b. The X-ray transmissive window 100 is mounted in the cap 701a. Consequently, external X-rays can be detected with the detecting element 702 while isolating the interior of the enclosure 701 from the outside. Terminals connected with the detecting element 702 are mounted on the terminal board 701b.

The detecting element 702 detects X-rays transmitted through the X-ray transmissive window 100. The detecting element 702 is a silicon drift detector, for example. The output signal from the detecting element 702 is sent to the signal transmission circuit 707 via terminals and wiring connected to the terminals. The output signal from the signal transmission circuit 707 is sent to the signal amplification circuit 708.

The cooling element 704 cools the detecting element 702. The cooling element 704 is a Peltier device, for example. Heat released from the cooling element 704 is conducted to the heat pipe 706 and then dissipated by means of a heat dissipating plate (not shown).

The signal amplification circuit 708 amplifies the signal from the detecting element 702. The output signal from the signal amplification circuit 708 is sent to an information processor (not shown), which in turn creates a spectrum, for example, based on the signal from the detecting element 702.

The X-ray detector 700 can have improved detection sensitivity because it includes the X-ray transmissive window 100 having high X-ray transmissivity.

It is to be noted that the present invention is not restricted to the above-described embodiments but rather can be practiced in variously modified forms. For example, the present invention embraces configurations (e.g., configurations identical in function, method, and results or identical in purpose and advantageous effects) which are substantially identical to the configurations described in any one of the above embodiments. Also, the invention embraces configurations which are similar to the configurations described in any one of the above embodiments except that their nonessential portions have been replaced. Additionally, the invention embraces configurations which are identical in advantageous effects to, or which can achieve the same object as, the configurations described in any one of the above embodiments. Further, the invention embraces configurations which are similar to the configurations described in any one of the above embodiments except that a well-known technique is added.

What is claimed is:

1. A radiation transmissive window comprising:
    an outer frame having an opening;
    a radiation transmissive film closing off the opening; and
    a grid member that partitions the opening into a plurality of small opening portions;
    wherein said grid member has a first portion, a second portion of a smaller width than the first portion, and a third portion of a smaller width than the second portion;
    wherein a distance between the first portion and a center of the opening is greater than a distance between the second portion and the center of the opening; and
    wherein the distance between the second portion and the center of the opening is greater than a distance between the third portion and the center of the opening.

2. The radiation transmissive window as set forth in claim 1, wherein said first portion surrounds said second portion, and wherein said second portion surrounds said third portion.

3. The radiation transmissive window as set forth in claim 1, wherein each of the plurality of said small opening portions which lie between said second portion and said third portion is greater in area than each of the plurality of said small opening portions which lie between said first portion and said second portion.

4. The radiation transmissive window as set forth in claim 1, wherein said third portion is smaller in height than said second portion, and wherein said second portion is smaller in height than said first portion.

5. The radiation transmissive window as set forth in claim 1, wherein said first portion is smaller in height than said second portion, and wherein said second portion is smaller in height than said third portion.

6. The radiation transmissive window as set forth in claim 1, wherein said first portion, said second portion, and said third portion are equal in height.

7. The radiation transmissive window as set forth in claim 1, wherein the plurality of small opening portions are arranged in a plurality of rows and a plurality of columns and equally spaced from each other in a direction of the rows and in a direction of the columns.

8. A radiation detector including the radiation transmissive window as set forth in claim 1.

9. A radiation transmissive window comprising:
    an outer frame having an opening;
    a radiation transmissive film closing off the opening; and
    a grid member that partitions the opening into a plurality of small opening portions;
    wherein said grid member has a first portion, a second portion of a smaller width than the first portion, and a third portion of a smaller width than the second portion;
    wherein a distance between the first portion and a center of the opening is smaller than a distance between the second portion and the center of the opening; and
    wherein the distance between the second portion and the center of the opening is smaller than a distance between the third portion and the center of the opening.

10. The radiation transmissive window as set forth in claim 9, wherein said third portion surrounds said second portion, and wherein said second portion surrounds said first portion.

11. The radiation transmissive window as set forth in claim 9, wherein each of the plurality of said small opening portions which lie between said second portion and said third portion is greater in area than each of the plurality of said small opening portions which lie between said first portion and said second portion.

12. The radiation transmissive window as set forth in claim 9, wherein said third portion is smaller in height than said second portion, and wherein said second portion is smaller in height than said first portion.

13. The radiation transmissive window as set forth in claim 9, wherein said first portion is smaller in height than said second portion, and wherein said second portion is smaller in height than said third portion.

14. The radiation transmissive window as set forth in claim 9, wherein said first portion, said second portion, and said third portion are equal in height.

15. The radiation transmissive window as set forth in claim 9, wherein said small opening portions are arranged in a plurality of rows and a plurality of columns and equally spaced from each other in a direction of the rows and in a direction of the columns.

16. A radiation detector including the radiation transmissive window as set forth in claim 9.

\* \* \* \* \*

UNITED STATES PATENT AND TRADEMARK OFFICE
CERTIFICATE OF CORRECTION

PATENT NO. : 11,393,606 B2
APPLICATION NO. : 17/210745
DATED : July 19, 2022
INVENTOR(S) : Hirofumi Nakano It is certified that error appears in the above-identified patent and that said Letters Patent is hereby corrected as shown below:

On the Title Page

Column 1, Item (54) Title, Line 2, Delete "RADITION" and insert -- RADIATION --

In the Specification

Column 1, Line 2, Delete "RADITION" and insert -- RADIATION --

Signed and Sealed this
Third Day of January, 2023

Katherine Kelly Vidal
*Director of the United States Patent and Trademark Office*